US012610944B2

(12) United States Patent
Mi et al.

(10) Patent No.: US 12,610,944 B2
(45) Date of Patent: Apr. 28, 2026

(54) AUTOMATIC CELL CRYOPRESERVATION AND THAWING APPARATUS

(71) Applicant: DRSIGNAL BIOTECHNOLOGY CO. LTD., Taipei City (TW)

(72) Inventors: Hsin-Wu Mi, Taipei City (TW);
Chih-Huang Lin, Taipei City (TW);
Hsin-Fei Huang, Taipei City (TW);
Chia-I Hsu, Taipei City (TW)

(73) Assignee: DRSignal BioTechnology Co., Ltd.,
Taipei City (TW)

( * ) Notice: Subject to any disclaimer, the term of this patent is extended or adjusted under 35 U.S.C. 154(b) by 752 days.

(21) Appl. No.: 18/069,339

(22) Filed: Dec. 21, 2022

(65) Prior Publication Data

US 2024/0206457 A1 Jun. 27, 2024

(51) Int. Cl.
*A01N 1/147* (2025.01)
*A01N 1/144* (2025.01)

(52) U.S. Cl.
CPC ............. *A01N 1/147* (2025.01); *A01N 1/144* (2025.01)

(58) Field of Classification Search
None
See application file for complete search history.

(56) References Cited

U.S. PATENT DOCUMENTS

2004/0037680 A1 2/2004 Arita
2005/0058574 A1* 3/2005 Bysouth ............. G01N 15/0227
422/63

2008/0050278 A1* 2/2008 Farina .................... G01N 35/00
422/64
2008/0090288 A1 4/2008 Hibino et al.
2009/0068064 A1 3/2009 Gordon
2015/0334774 A1* 11/2015 Schryver ............. A47J 36/2483
219/442
2019/0185846 A1 6/2019 Masquelier et al.
2019/0293344 A1 9/2019 Sun et al.
2020/0114344 A1 4/2020 Mi et al.

FOREIGN PATENT DOCUMENTS

CN 101219732 A 7/2008
CN 109399043 A 3/2019
CN 112573005 A 3/2021
CN 113528341 A 10/2021
(Continued)

*Primary Examiner* — Elizabeth A Robinson
*Assistant Examiner* — Jonathan E Lepage
(74) *Attorney, Agent, or Firm* — Rosenberg, Klein & Lee

(57) ABSTRACT

A cryopreservation cartridge has a frame and multiple cryopreservation trays. The frame has multiple mounting walls. Any two of the mounting walls have multiple tray shelf segments formed therebetween. The cryopreservation trays are respectively and detachably mounted on the tray shelf segments. Each of the cryopreservation trays has multiple cryovial mounting holes. Each of the cryovial mounting holes is adapted to load a cryovial. The cryopreservation cartridge is assembled by a frame and multiple cryopreservation trays so that one cryopreservation tray can be detached from the frame and held by a picker and then a mechanical arm can easily access any single cryovial loaded in the cryopreservation tray, thereby facilitating process of placing in or taking out the cryovial for automatic operation of cell cryopreservation and thawing.

7 Claims, 12 Drawing Sheets

(56) References Cited

FOREIGN PATENT DOCUMENTS

| | | | | | |
|---|---|---|---|---|---|
| CN | 215246325 | U | 12/2021 | | |
| CN | 215668049 | U | 1/2022 | | |
| CN | 111634567 | B | 3/2022 | | |
| JP | 6934418 | B2 | 9/2021 | | |
| JP | 2022-518101 | A1 | 3/2022 | | |
| TW | I678966 | B | 12/2019 | | |
| TW | 202144252 | A | 12/2021 | | |
| TW | M630065 | U | 8/2022 | | |
| WO | WO-9303891 | A1 * | 3/1993 | ............. | A01N 1/144 |
| WO | WO-2006037760 | A1 * | 4/2006 | ............... | G01N 1/42 |
| WO | WO-2006102416 | A2 * | 9/2006 | ........... | C12M 41/48 |
| WO | 2011066269 | A1 | 6/2011 | | |
| WO | 2013002268 | A1 | 1/2013 | | |
| WO | WO-2017014999 | A1 * | 1/2017 | ........ | G01N 35/0099 |
| WO | 2020093585 | A1 | 5/2020 | | |
| WO | 2022013313 | A1 | 1/2022 | | |

* cited by examiner

11

AUTOMATIC CELL CRYOPRESERVATION AND THAWING APPARATUS

BACKGROUND OF THE INVENTION

1. Field of the Invention

The present invention relates to a biochemical experimental apparatus, especially to an automatic cell cryopreservation and thawing apparatus and a cryopreservation cartridge that facilitates the operation of the mechanical arm designed specifically for the automatic cell cryopreservation and thawing apparatus.

2. Description of the Prior Arts

In a cell culture procedure, cells or specimens need to be cryopreserved after being dispensed into cryovials, and the cryovials are usually placed in a cryopreservation tank (a tank comprising liquid or gaseous nitrogen) for cryopreservation of cells or specimens. Specifically, the cryovials containing cells or specimens will be first placed into a gradual freezing device. After the cryovials containing cells or specimens are cooled to −80 degrees Celsius, the cryovials will be placed on a cryovial rack, and then the loaded cryovial rack will be placed in the cryopreservation tank for long term cryopreservation. Once the cells or specimens need to be thawed in the cell culture procedure, the processes for thawing cryopreserved cells are as follows. The cryovials containing cells or specimens will be taken out from the cryopreservation tank first and then moved into a thermostatic device for temperature recovery. After the cryopreserved cells are thawed, the liquid cells will be transferred to a culture vessel comprising culture medium for the cultivation of cells, and the cell thawing processes are accomplished.

However, regardless of whether cell freezing or thawing is performed, the cryovial rack needs to be taken out from the cryopreservation tank. The conventional cryovial rack is an integrally formed multi-shelves carrier, such that the mechanical arm cannot directly access the cryovials in a middle layer or in an inner side of the rack, which are only accessible for manual operation instead. Therefore, the steps are cumbersome and time-consuming when installing or removing cryovials in some particular positions, especially for mechanical operation. As a result, during loading or removal of a single cryovial on a specific rack, other cryovials on the same rack would stay out of the cryopreservation tank for a period of time, which possibly makes the temperature of the other cryovials on the same rack unnecessarily increased to jeopardize the viability of the cells in the cryovials, thereby affecting quality of the cell thawing in the next cell culture process.

To overcome the shortcomings, the present invention provides an automatic cell cryopreservation and thawing apparatus and a cryopreservation cartridge for the automatic cell cryopreservation and thawing apparatus to mitigate or obviate the aforementioned problems.

SUMMARY OF THE INVENTION

The main objective of the present invention is to provide an automatic cell cryopreservation and thawing apparatus and a cryopreservation cartridge that facilitates the operation of the mechanical arm designed specifically for the automatic cell cryopreservation and thawing apparatus. The cryopreservation cartridge has a separable frame and multiple cryopreservation trays such that one of the cryopreservation trays can be detached from the frame by a picker and then the mechanical arm can easily access any single cryovial on said cryopreservation tray, thereby facilitating automatic operation of loading or removing the cryovials on the cryopreservation trays.

The cryopreservation cartridge has a frame and multiple cryopreservation trays. The frame has multiple mounting walls. Any two of the mounting walls have multiple tray shelf segments formed therebetween. The cryopreservation trays are respectively and detachably mounted on the tray shelf segments. Each of the cryopreservation trays has multiple cryovial mounting holes. Each of the cryovial mounting holes is adapted to load a cryovial.

By designing the cryopreservation cartridge to include a frame and detachable cryopreservation trays, after the cartridge moving mechanism moves the cryopreservation cartridge out of the cryopreservation tank, one of the cryopreservation trays can be taken out from the frame by the cryopreservation tray picker, and then the mechanical arm can place in or take out the cryovials one by one, which makes the operation of the mechanical arm more easily access the cryovials in the middle layer or in the inner side of the cryopreservation trays, and the cryopreservation cartridge is allowed to be placed back into the cryopreservation tank right after the cryopreservation tray is moved and separated from the cryopreservation cartridge to avoid the risk of prolonged exposure of the other cryovials in the cryopreservation cartridge to the atmosphere outside of the cryopreservation tank.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
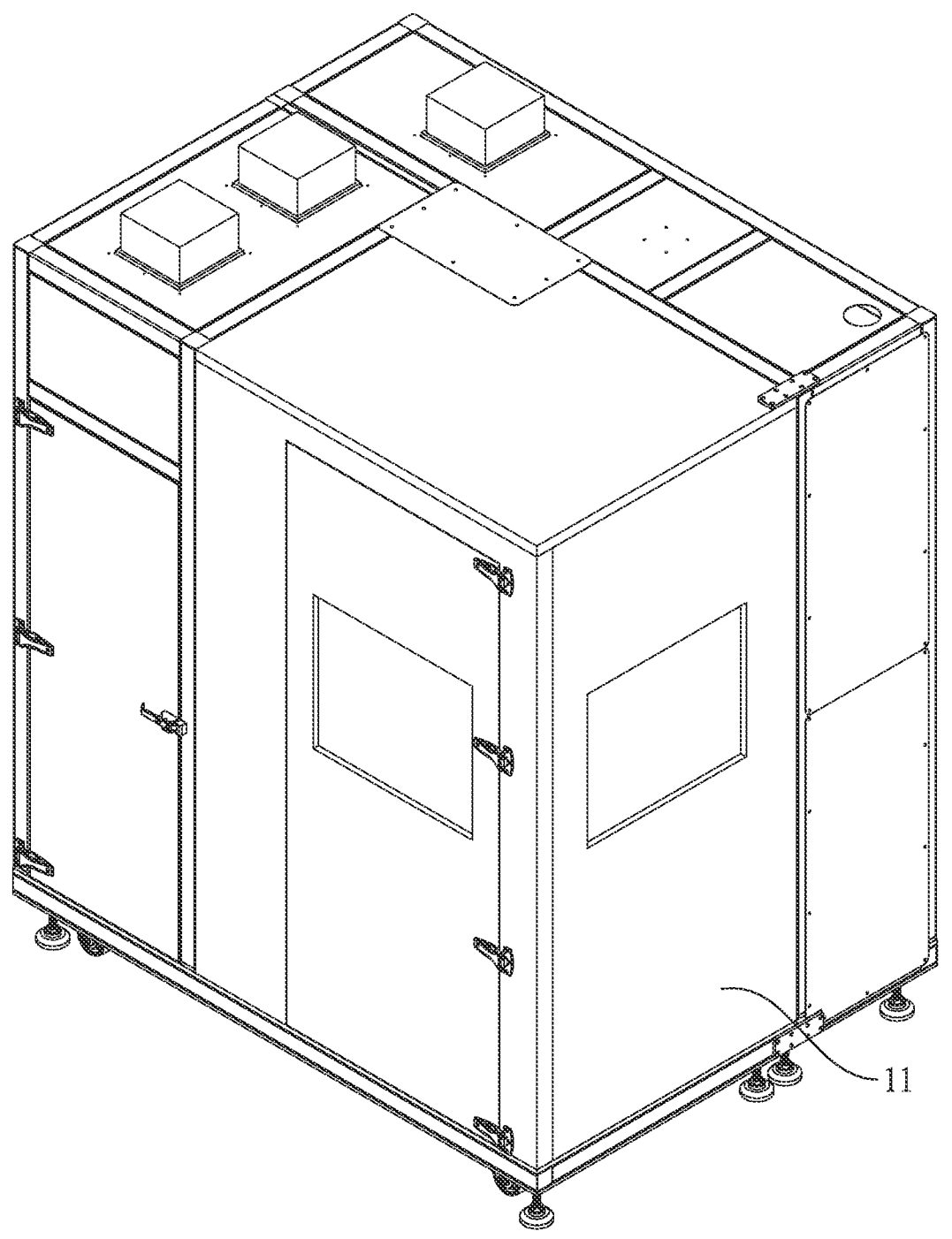
FIG. 1 is a perspective view of an automatic cell cryopreservation and thawing apparatus in accordance with the present invention.
Figure 2:
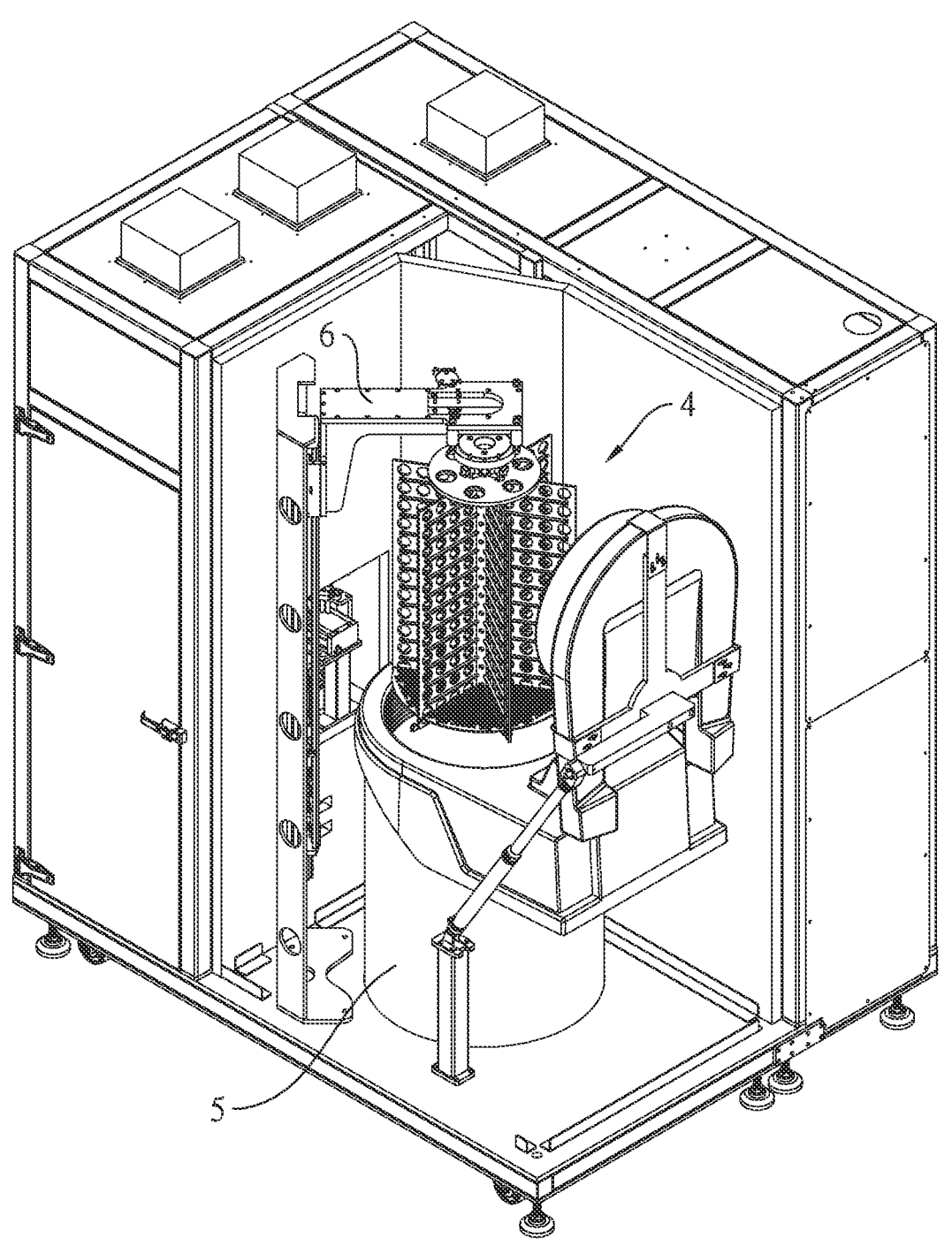
FIG. 2 is another perspective view of the automatic cell cryopreservation and thawing apparatus in FIG. 1, showing the inner side of the refrigeration room.

With reference to FIGS. 1, 4A, 4B, and 10, an automatic cell cryopreservation and thawing apparatus in accordance with the present invention comprises an input and output unit 1, a mechanical arm 2, a gradual freezing device 3, a cryopreservation cartridge 4, a cryopreservation tank 5, a cartridge moving mechanism 6, a cryopreservation tray picker 7, a thermostatic device 8, a cell culture flask storage rack 9, a cover operating device 10, a refrigeration room 11, a refrigeration tunnel 12, and a temperature maintaining cover 13.

Figure 3:
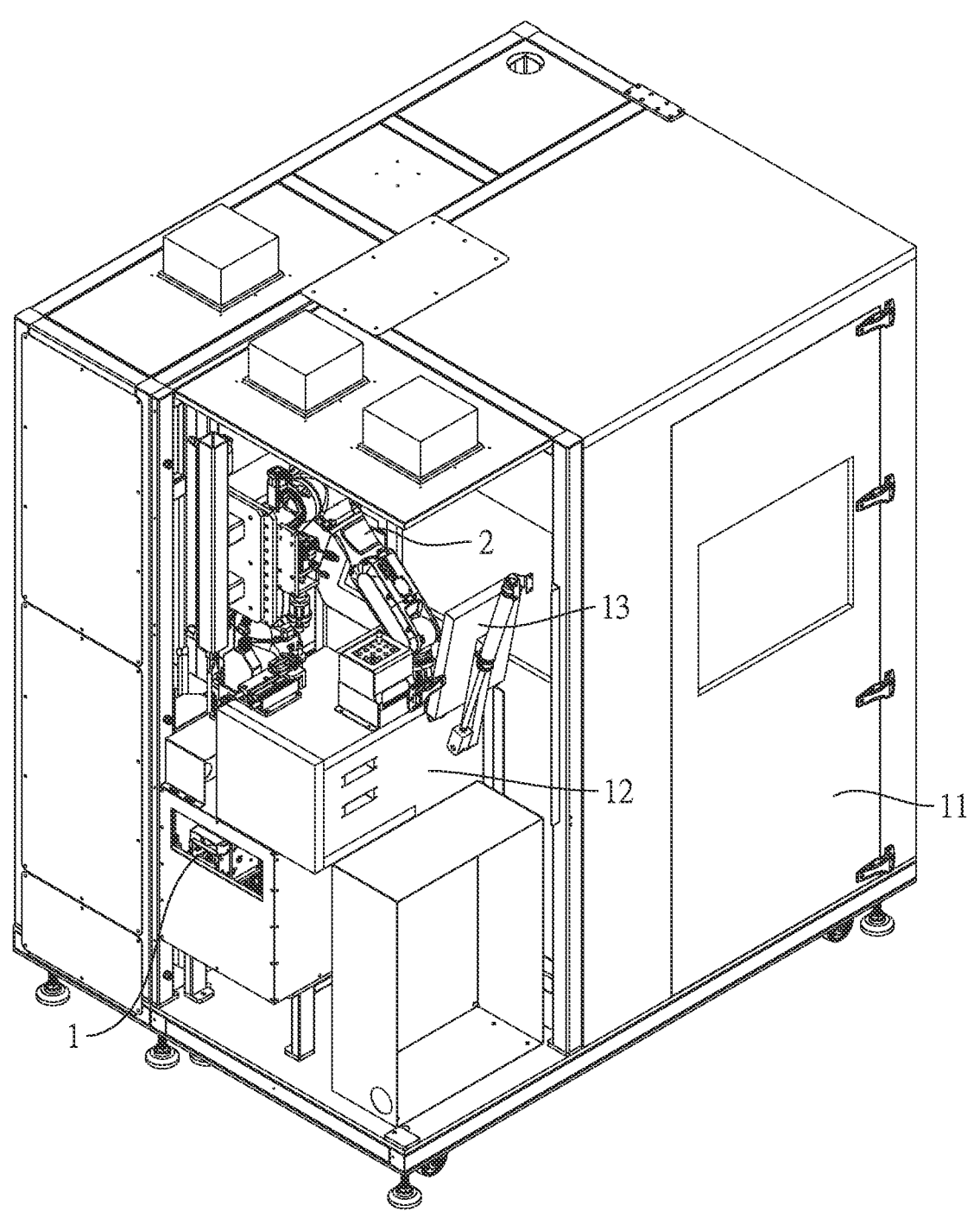
FIG. 3 is still another perspective view of the automatic cell cryopreservation and thawing apparatus in FIG. 1, showing the inner side of the refrigeration tunnel.
Figure 4A:
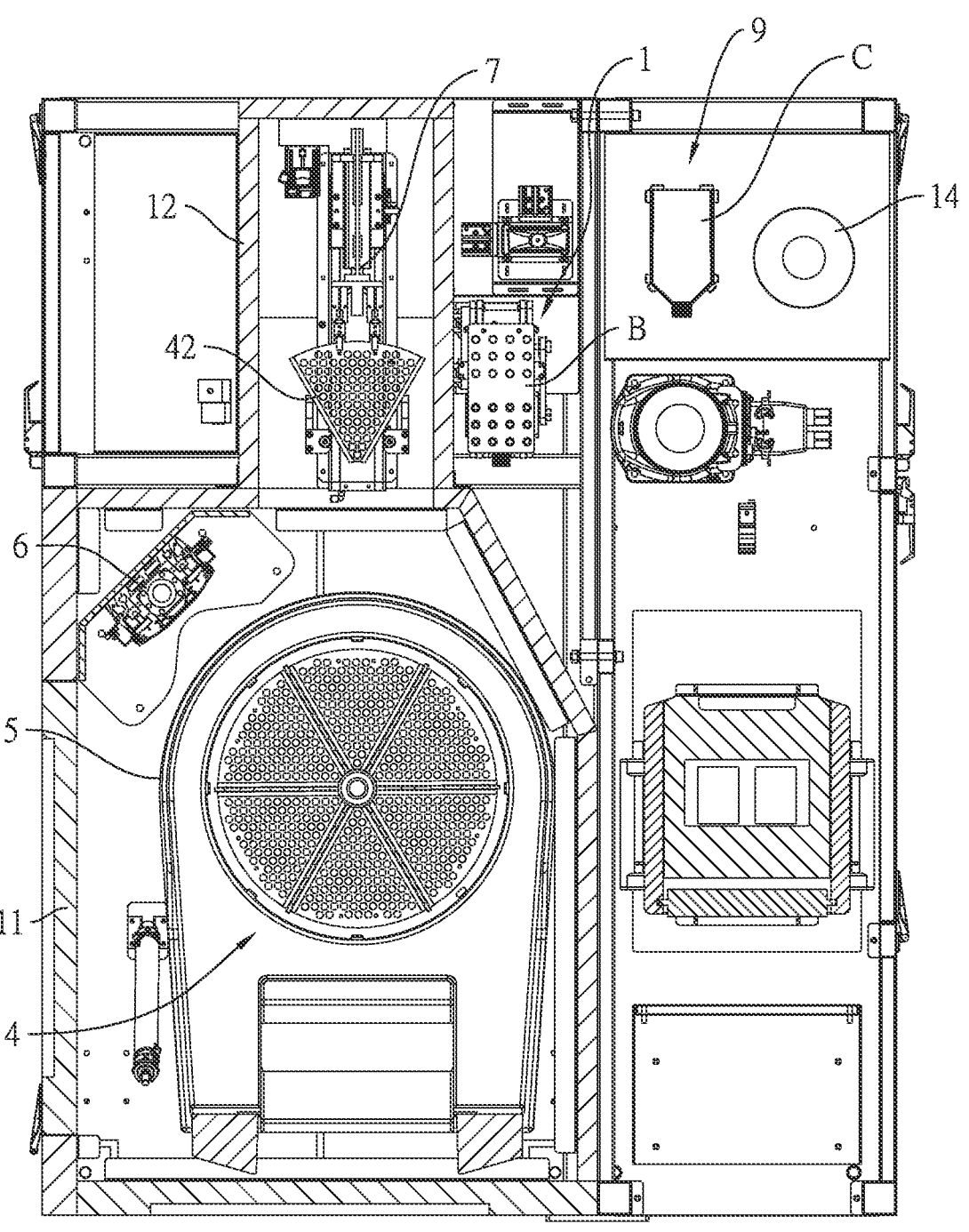
FIG. 4A is a top view in cross-section of the automatic cell cryopreservation and thawing apparatus in FIG. 1, showing the cryovial rack placed in the input and output unit.
Figure 4B:
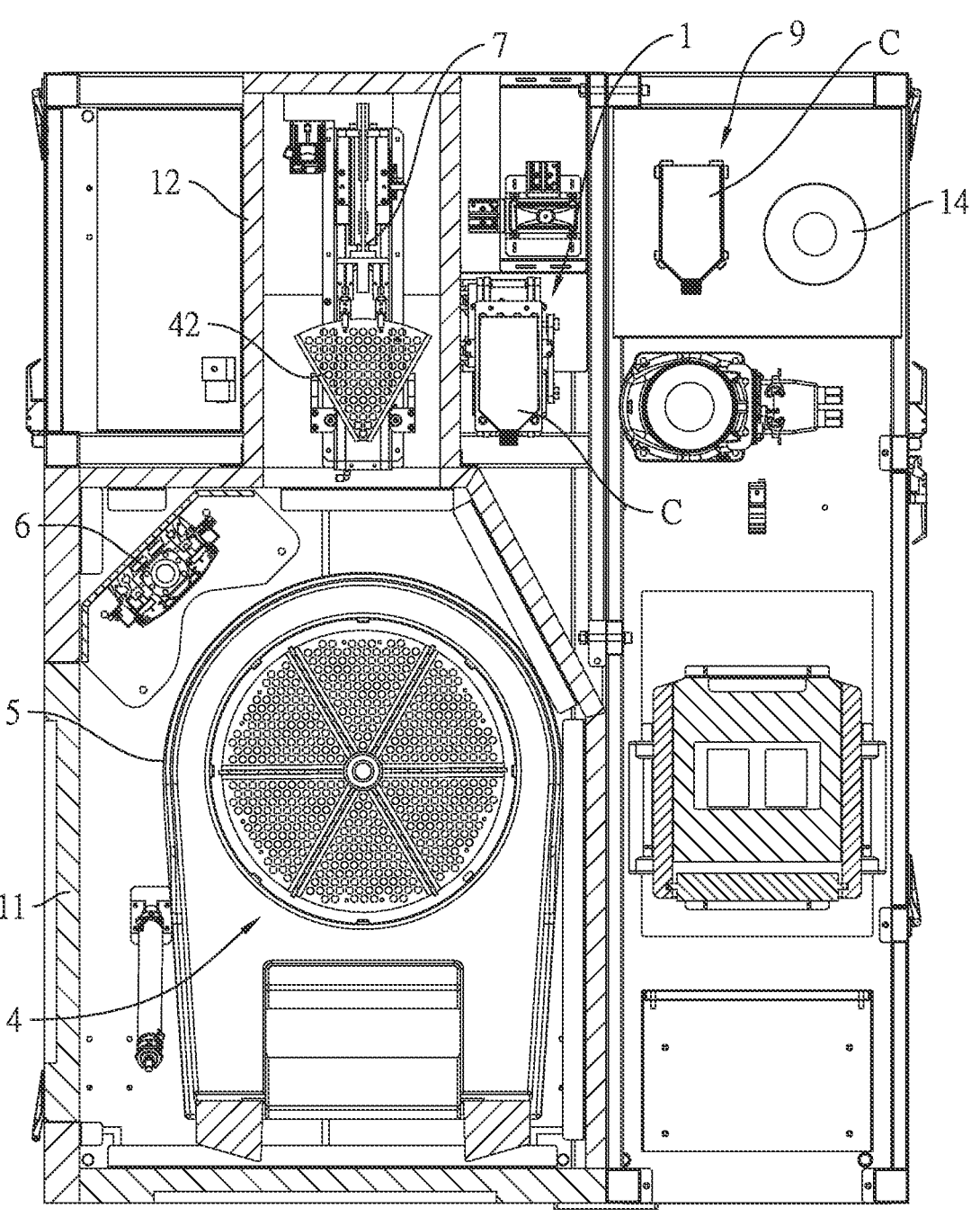
FIG. 4B is another top view in cross-section of the automatic cell cryopreservation and thawing apparatus in FIG. 1, showing the cell culture flask placed in the input and output unit.

With reference to FIGS. 3, 4A, and 4B, the input and output unit 1 allows a cryovial rack B or a cell culture flask C to enter and exit.

Figure 8:
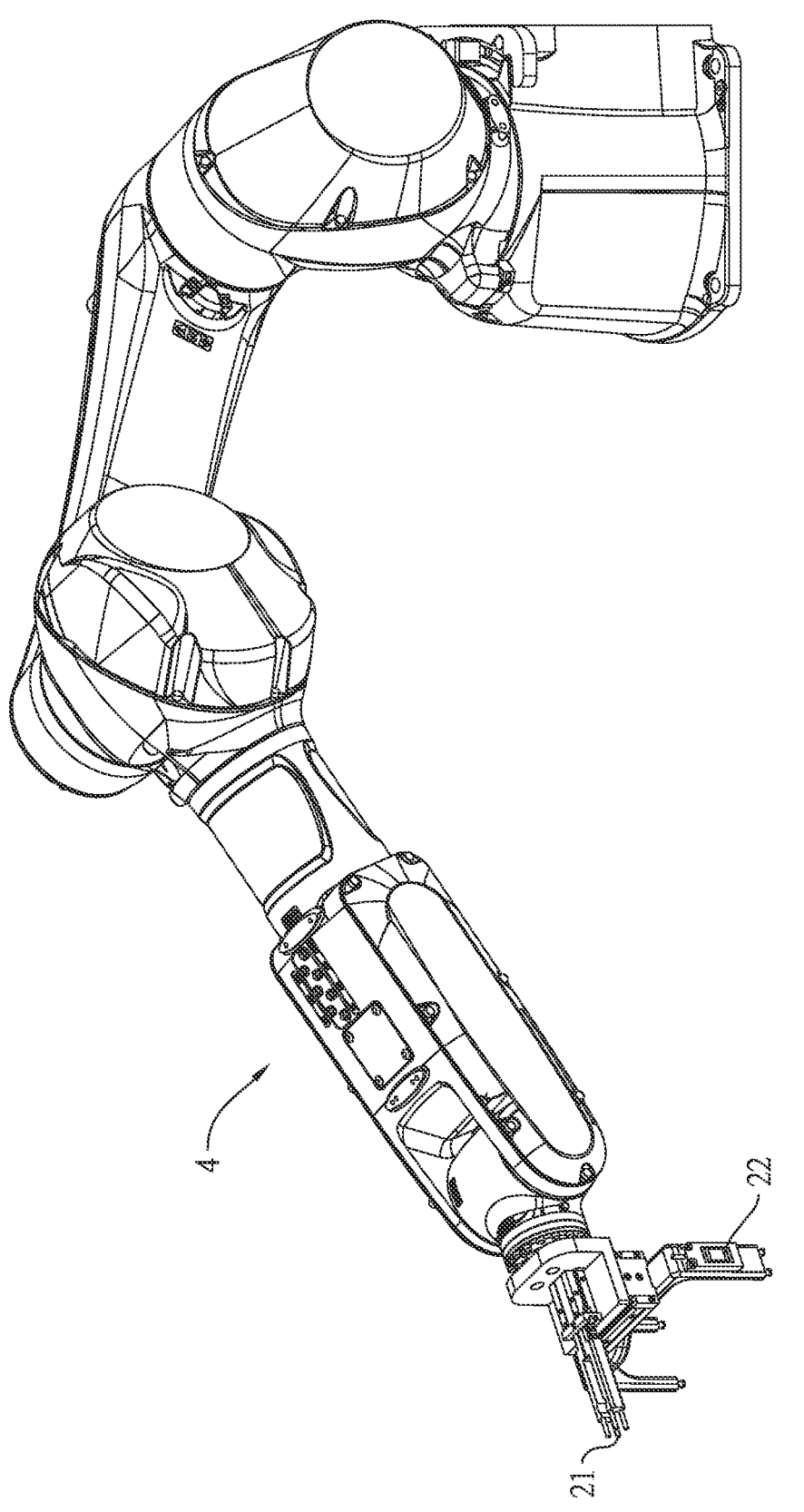
FIG. 8 is still another perspective view of the automatic cell cryopreservation and thawing apparatus in FIG. 1, showing the mechanical arm.
Figure 9:
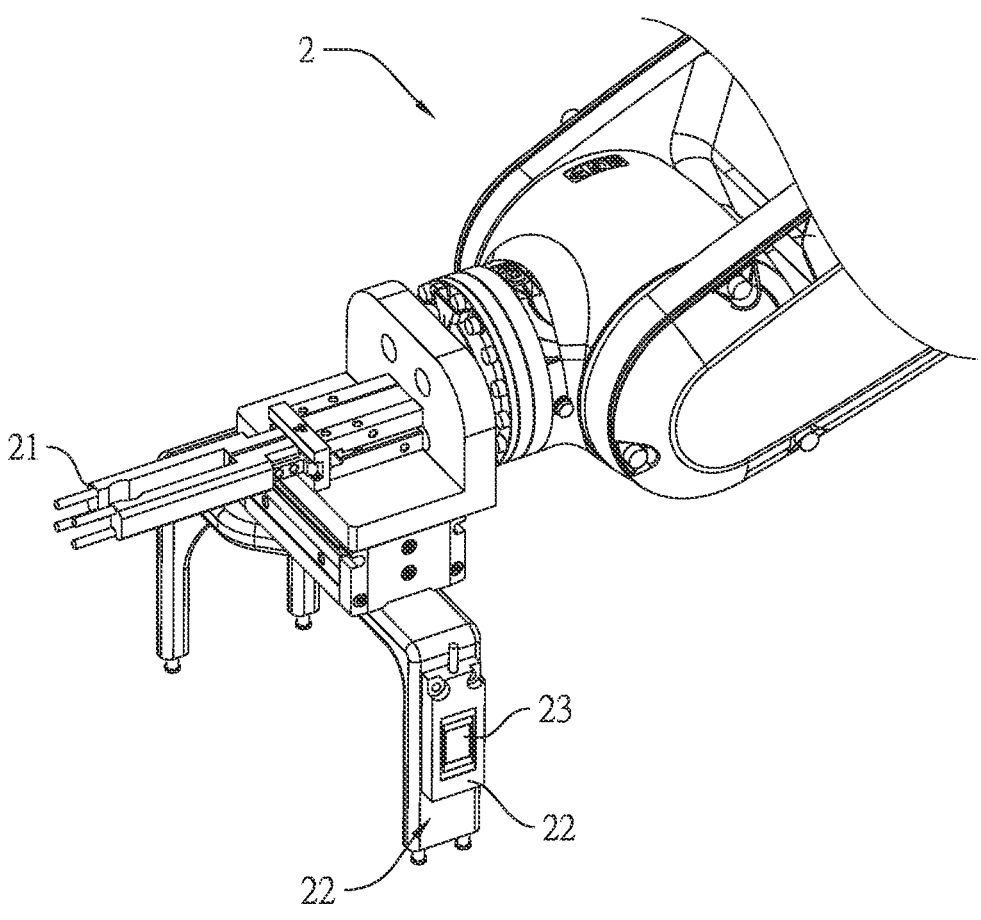
FIG. 9 is a partially enlarged view of the automatic cell cryopreservation and thawing apparatus in FIG. 1, showing the mechanical arm.
Figure 10:
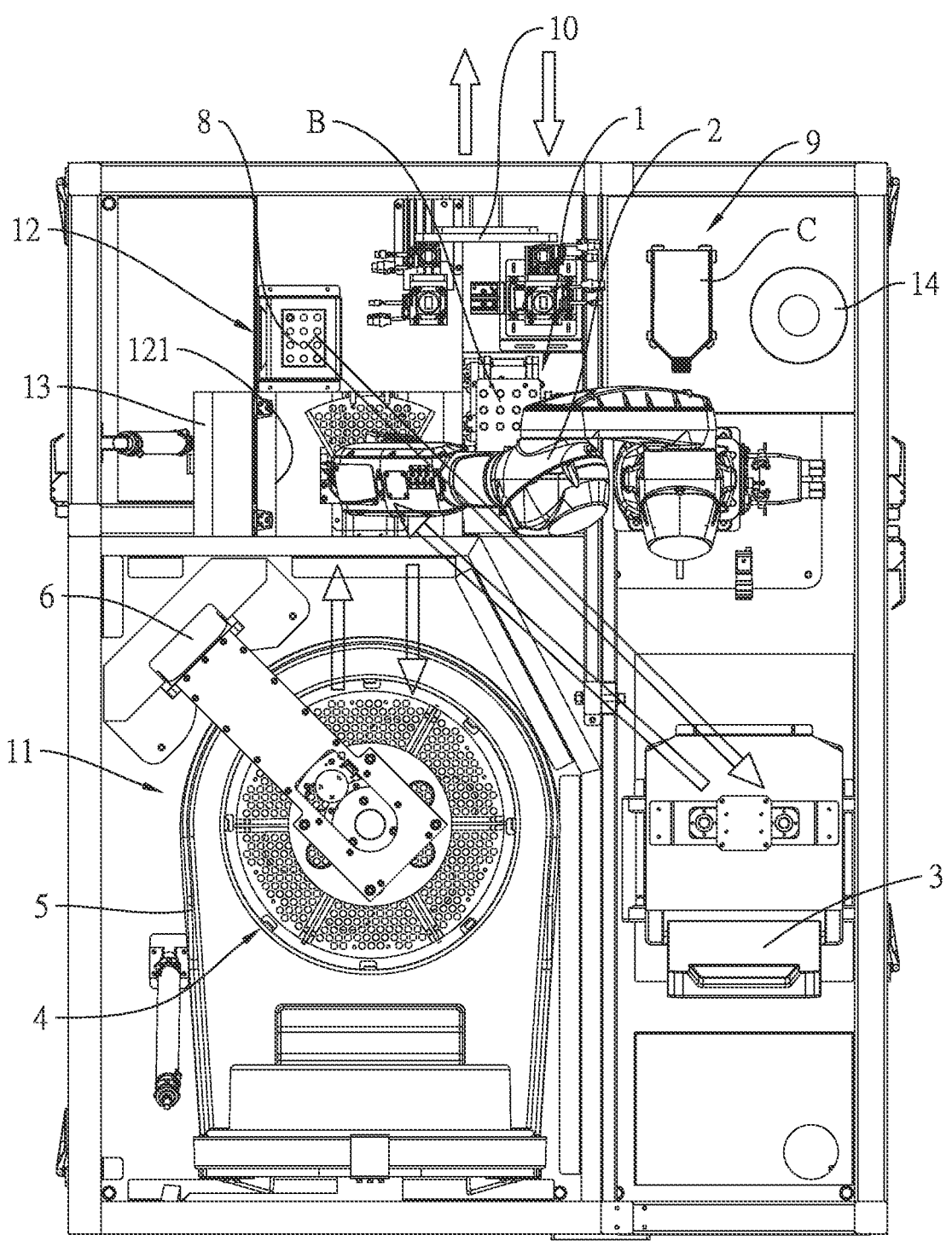
FIG. 10 is another top view of the automatic cell cryopreservation and thawing apparatus in FIG. 1, showing the path of the cell cryopreservation process.
Figure 11:
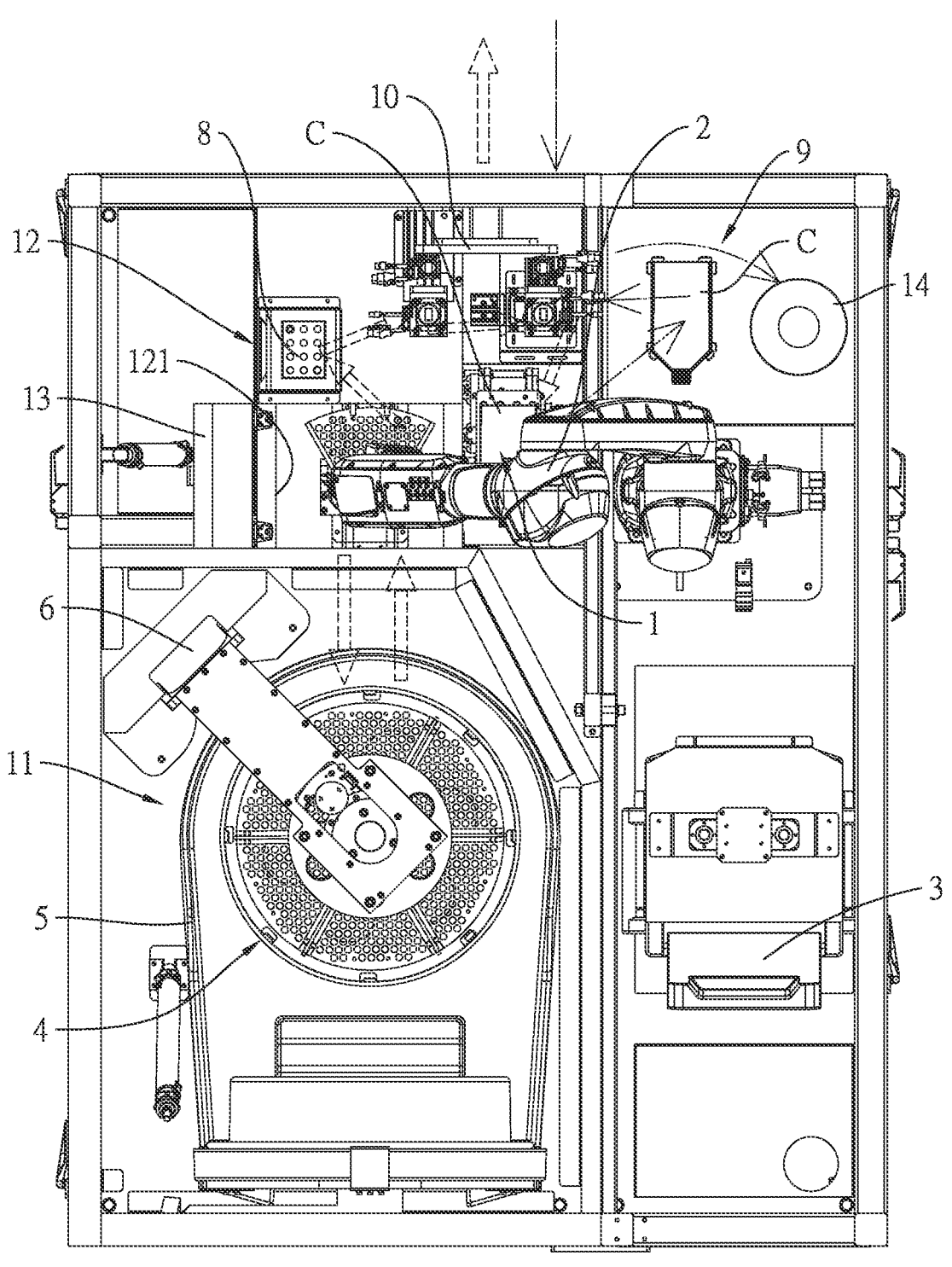
FIG. 11 is still another top view of the automatic cell cryopreservation and thawing apparatus in FIG. 1, showing the path of the cell thawing processes and transferring the cells in the cryovial to the cell culture flask with culture medium for the further cell culture.

With reference to FIGS. 10 and 11, the mechanical arm 2 is capable of moving a cryovial A from the input and output unit 1 to the gradual freezing device 3. The gradual freezing device 3 is capable of decreasing the temperature of the cryovial A. Specifically, with reference to FIGS. 8 and 9, the mechanical arm 2 has a first clamp 21 and a second clamp 22. The first clamp 21 and the second clamp 22 are respectively adapted to clamp and carry the cryovial A and the cell culture flask C in the input and output unit 1.

Figure 5:
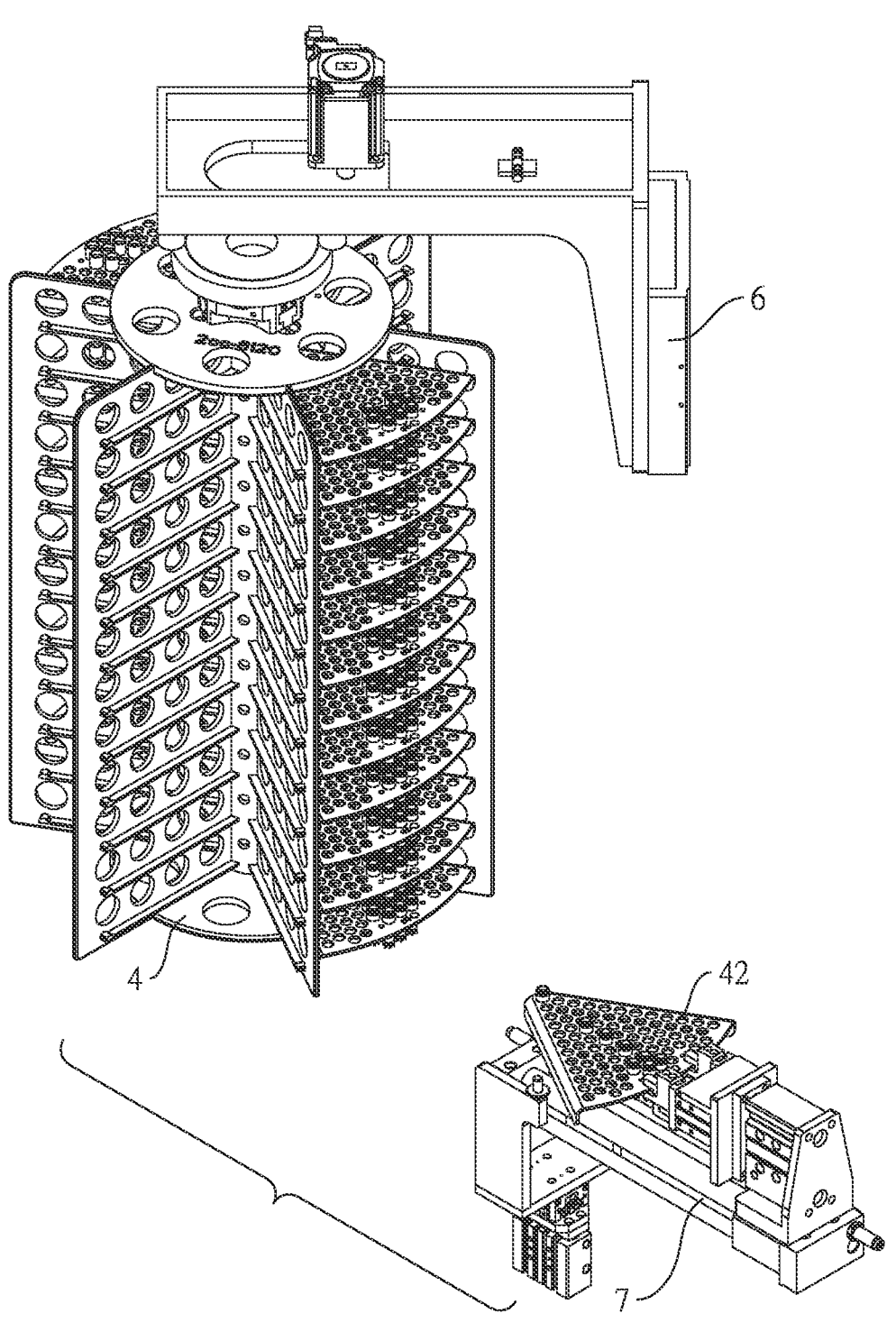
FIG. 5 is still another perspective view of the automatic cell cryopreservation and thawing apparatus in FIG. 1, showing position of the cryopreservation tray picker relative to the cryopreservation cartridge.
Figure 6:
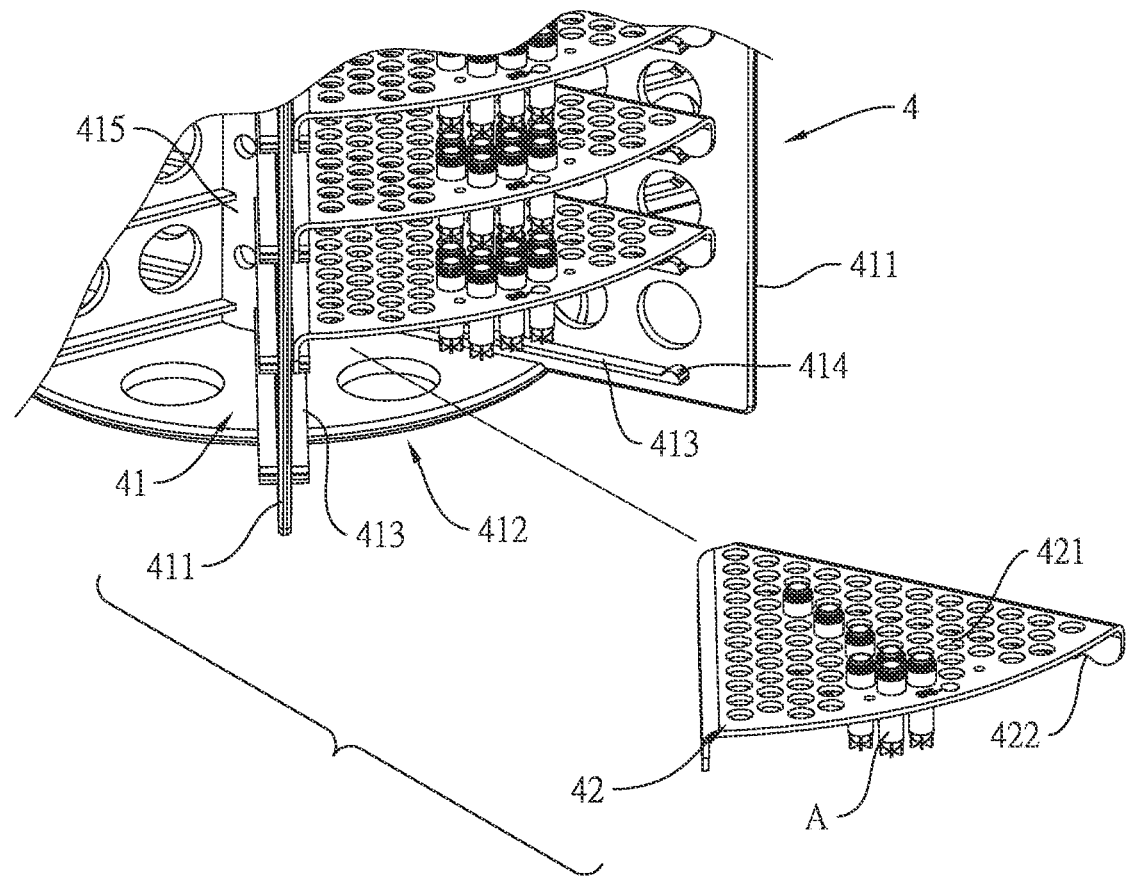
FIG. 6 is an exploded view of the automatic cell cryopreservation and thawing apparatus in FIG. 1, showing the cryopreservation tray and the frame.

With reference to FIGS. 5 and 6, the cryopreservation cartridge 4 is assembled by a frame 41 and multiple cryopreservation trays 42. The frame 41 has multiple mounting walls 411. Multiple tray shelf segments 412 are formed between any two of the mounting walls 411. The cryopreservation trays 42 are respectively and detachably mounted on the tray shelf segments 412. Each of the cryopreservation trays 42 has multiple cryovial mounting holes 421. Each of the cryovial mounting holes 421 is adapted to load a cryovial A. The mechanical arm 2 is capable of moving the cryovial A to the cryovial mounting hole 421 for storage.

Specifically, in this embodiment, multiple mounting ribs 413 are formed on each of the mounting walls 411. The mounting ribs 413 on one of the mounting walls 411 and the mounting ribs 413 on another one of the mounting walls 411 form the tray shelf segments 412. Each of the cryopreservation trays 42 is detachably mounted on two of the mounting ribs 413 of any two of the mounting walls 411. Besides, each of the mounting ribs 413 forms a position limiting protrusion 414. Each of the cryopreservation trays 42 forms two position limiting recesses 422. The two position limiting recesses 422 are capable of respectively engaging with the position limiting protrusions 414 of the mounting ribs 413 to prevent said cryopreservation tray 42 from moving arbitrarily and detaching from the frame 41. Moreover, in this embodiment, the frame 41 has a central axle 415. The mounting walls 411 surround the central axle 415, are spaced apart from each other, and extend along a radial direction of the central axle 415. Each of the cryopreservation trays 42 is in a sector shape. The structure of the frame

41 and the cryopreservation tray 42 is not limited to the abovementioned, as long as the cryopreservation trays 42 are detachably mounted on the frame 41.

The cryopreservation tank 5 has a cryopreservation space formed inside.

The cartridge moving mechanism 6 is capable of moving the cryopreservation cartridge 4 into or out of the cryopreservation space of the cryopreservation tank 5.

Figure 7:
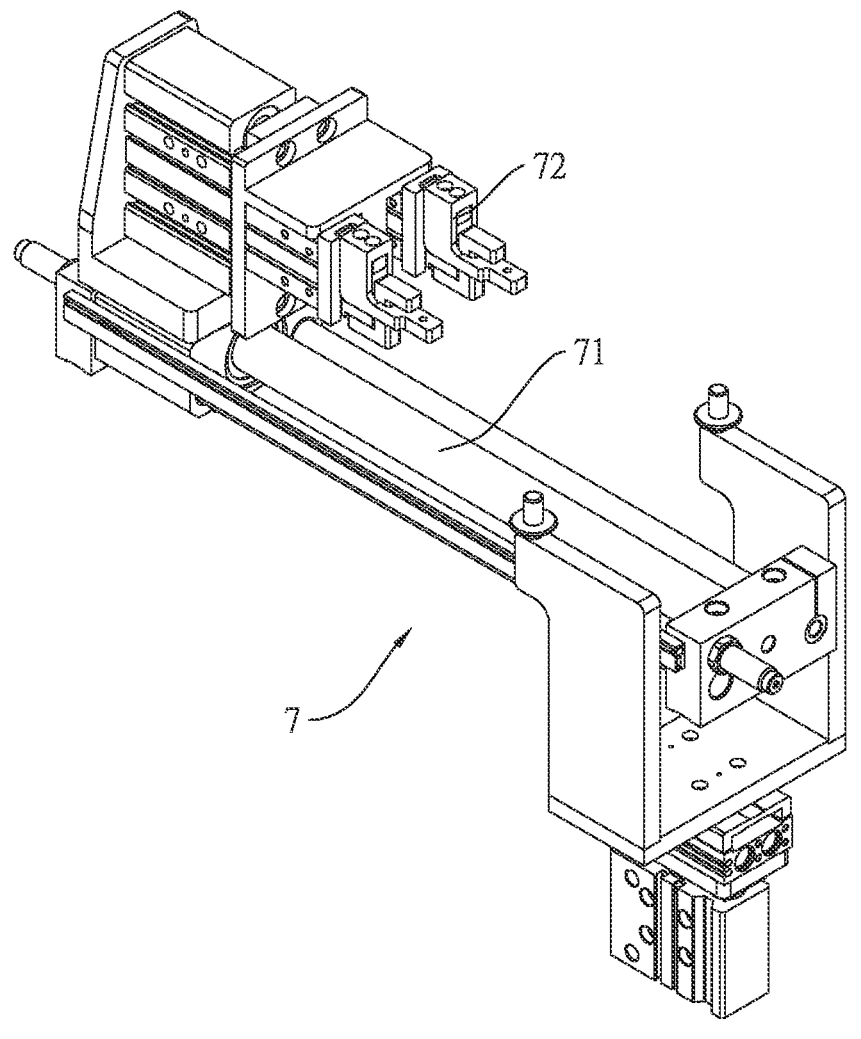
FIG. 7 is still another perspective view of the automatic cell cryopreservation and thawing apparatus in FIG. 1, showing the cryopreservation tray picker.

The cryopreservation tray picker 7 is capable of removing or placing one of the cryopreservation trays 42 from or onto one of the tray shelf segments 412 after the cartridge moving mechanism 6 moves the cryopreservation cartridge 4 out of the cryopreservation space. Specifically, with reference to FIGS. 5 and 7, the cryopreservation tray picker 7 has a slide track 71 and a clamp unit 72. The clamp unit 72 is capable of moving along the slide track 71 toward the cryopreservation cartridge 4 moved out of the cryopreservation space by the cartridge moving mechanism 6, and is capable of returning to the original position along the slide track 71 after picking one of the cryopreservation trays 42, so as to remove or place one of the cryopreservation trays 42 from or onto one of the tray shelf segments 412. The structure of the cryopreservation tray picker 7 is not limited to the abovementioned.

The thermostatic device 8 is capable of heating for the temperature recovery of the cryovial A. The mechanical arm 2 is capable of moving any single one cryovial A mounted on the cryopreservation tray 42 held by the cryopreservation tray picker 7 into the thermostatic device 8.

The cell culture flask storage rack 9 is adapted to store cell culture flasks C. The mechanical arm 2 is capable of moving the cell culture flask C in the input and output unit 1 into the cell culture flask storage rack 9.

The cover operating device 10 is capable of opening and closing a cover of the cryovial A, and is capable of opening and closing a cover of the cell culture flask C. The mechanical arm 2 is capable of moving the cryovial A in the thermostatic device 8 to the cover operating device 10, and is capable of moving one of the cell culture flasks C in the cell culture flask storage rack 9 to the cover operating device 10.

With reference to FIGS. 1, 2, 3, 4A, and 4B, specifically, in this embodiment, the automatic cell cryopreservation and thawing apparatus has the refrigeration room 11, the refrigeration tunnel 12, and the temperature maintaining cover 13. A temperature in the refrigeration room 11 is lower than a temperature outside of the refrigeration room 11. Preferably, the temperature in the refrigeration room 11 is 4 degrees Celsius. The refrigeration tunnel 12 is connected to the refrigeration room 11 to expand the refrigeration space for maintaining the refrigeration effect. An arm opening 121 is formed on a wall of the refrigeration tunnel 12. The temperature maintaining cover 13 is mounted on the arm opening 121 and selectively opens the arm opening 121.

The cryopreservation cartridge 4, the cryopreservation tank 5, and the cartridge moving mechanism 6 are located in the refrigeration room 11. The cryopreservation tray picker 7 located in the refrigeration tunnel 12 is capable of extending into the refrigeration room 11 to remove or place one of the cryopreservation trays 42 from or onto one of the tray shelf segments 412. After the temperature maintaining cover 13 opens the arm opening 121, the mechanical arm 2 is capable of passing through the arm opening 121 to take out one of the cryovials A loaded on the cryopreservation tray 42 held by the cryopreservation tray picker 7 or to load the cryovials A onto the cryopreservation tray 42 held by the cryopreservation tray picker 7.

By the refrigeration room 11, the refrigeration tunnel 12, and the temperature maintaining cover 13, the cryovials A and the cryopreservation tray 42 on the cryopreservation cartridge 4 can be still exposed in an atmosphere with a desirably lower temperature than a room temperature during the operation of cell cryopreservation or thawing.

The automatic cell cryopreservation and thawing apparatus can automatically operate the following procedures:

1. Cell Cryopreservation Procedure:

With reference to FIGS. 4A, 6, and 10, a radio frequency identification (RFID) label is tagged to the cryovial A first, and then the cryovial A is placed on a cryovial rack B and is moved to the input and output unit 1. Next, with reference to FIGS. 9 and 10, the mechanical arm 2 reads the RFID label using a RFID reader 23 and picks the cryovials A one by one, and then moves the cryovials A into the gradual freezing device 3 to run a first pre-cryopreserving process. The cryovial rack B is discharged from the input and output unit 1 after all of the cryovials A are removed from the cryovial rack B. After the first pre-cryopreserving process of the cryovials A is finished, a cover of the cryopreservation tank 5 is opened and the cartridge moving mechanism 6 grips and raises the cryopreservation cartridge 4 out of the cryopreservation tank 5, and then the cryopreservation tray picker 7 picks and retrieves one of the cryopreservation trays 42 of the cryopreservation cartridge 4 from the frame 41. Next, the mechanical arm 2 moves the cryovials A in the gradual freezing device 3 after the first pre-cryopreserving process to the cryopreservation tray 42 held by the cryopreservation tray picker 7 in the refrigeration tunnel 12. After then, the cryopreservation tray picker 7 moves the cryopreservation tray 42 loaded with the cryovials A back on the tray shelf segment 412 of the frame 41, and the cartridge moving mechanism 6 moves downward the cryopreservation cartridge 4 back into the cryopreservation space of the cryopreservation tank 5; thereafter, the cell cryopreservation procedures are finished.

2. Cell Thawing and Cell Transferring Procedure:

With reference to FIGS. 4B and 11, before operating the thawing and cell transferring procedure, a radio frequency identification (RFID) label is tagged to an empty cell culture flask C, and the empty cell culture flask C is filled with culture medium by a dispenser first (the dispenser is not encompassed in the scope of the present invention), is sent to the input and output unit 1, and is moved to the cell culture flask storage rack 9 by the mechanical arm 2 for the cell thawing and cell transferring procedure. With reference to FIG. 11, when processing the cell thawing and cell transferring procedure, the mechanical arm 2 moves one of the cell culture flasks C with culture medium in the cell culture flask storage rack 9 to the cover operating device 10 for the cover opening operation. At the same time, the cover of the cryopreservation tank 5 is opened and the cartridge moving mechanism 6 raises upward the cryopreservation cartridge 4 out of the cryopreservation tank 5, and then the cryopreservation tray picker 7 picks one of the cryopreservation trays 42 of the cryopreservation cartridge 4 from the frame 41 into the refrigeration tunnel 12. Next, the mechanical arm 2 reads the RFID labels of chosen cryovials one by one and moves said chosen cryovials A to the thermostatic device 8 for the operation of temperature recovery. After the chosen cryovials A are moved to the thermostatic device 8, the cryopreservation tray picker 7 moves the cryopreservation tray 42 back onto the frame 41 and the cartridge moving mechanism 6 moves downward the cryopreservation cartridge 4 back into the cryopreservation tank 5 thereafter, and then the cover of the cryopreservation tank 5 is closed. After the thawing process of the chosen cryovials A is finished, the mechanical arm 2 moves the chosen cryovials A one by one to the cover operating device 10 for the cover opening operation. After said cell culture flask C and said chosen cryovials A are both opened, the thawed liquid cells in the chosen cryovials A are poured into the cell culture flask C, and then the covers of the chosen cryovials A are closed by the cover operating device 10. In the final step, the mechanical arm 2 moves the cell culture flask C containing the thawed liquid cells to the input and output unit 1, and said cell culture flask C tagged with RFID label is read again by the RFID reader and then is sent out of the automatic cell cryopreservation and thawing apparatus for the further cell culture process, while the covers of the chosen cryovials A are closed and then the chosen cryovials with covers are abandoned to a dump bucket 14. The cell thawing and cell transferring process is completed.

By designing the cryopreservation cartridge 4 to include a frame 41 and the detachable cryopreservation trays 42, after the cartridge moving mechanism 6 moves the cryopreservation cartridge 4 out of the cryopreservation tank 5, one of the cryopreservation trays 42 can be taken out from the frame 41 by the cryopreservation tray picker 7, and then the mechanical arm 2 can place in or take out the cryovials A one by one, which makes the operation of the mechanical arm 2 more easily access the cryovials A in the middle layer or in the inner side of the cryopreservation trays 42, and the cryopreservation cartridge 4 is allowed to be placed back into the cryopreservation tank 5 right after the cryopreservation tray 42 is moved and separated from the cryopreservation cartridge 4 to avoid the risk of prolonged exposure of the other cryovials A in the cryopreservation cartridge 4 to the atmosphere outside of the cryopreservation tank 5.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An automatic cell cryopreservation and thawing apparatus comprising:

an input and output unit allowing a cryovial rack or a cell culture flask to enter and exit;

a mechanical arm;

a gradual freezing device; the mechanical arm being capable of moving cryovials in the cryovial rack from the input and output unit to the gradual freezing device; the gradual freezing device being capable of decreasing the temperature of the cryovials;

a cryopreservation cartridge having a frame having multiple mounting walls; any two of the mounting walls having multiple tray shelf segments formed therebetween; and multiple cryopreservation trays respectively and detachably mounted on the tray shelf segments; each of the cryopreservation trays having multiple cryovial mounting holes; each of the cryovial mounting holes adapted to load a respective one of the cryovials; the mechanical arm being capable of moving each of the cryovials to be loaded in a respective one of the cryovial mounting holes;

a cryopreservation tank having a cryopreservation space;

a cartridge moving mechanism being capable of moving the cryopreservation cartridge out of or into the cryopreservation space of the cryopreservation tank;

a cryopreservation tray picker being capable of removing or placing one of the cryopreservation trays from or onto one of the tray shelf segments after the cartridge moving mechanism moves the cryopreservation cartridge out of the cryopreservation space;

a thermostatic device; the mechanical arm being capable of moving one of the cryovials from the cryopreservation tray held by the cryopreservation tray picker to the thermostatic device; the thermostatic device being capable of increasing the temperature of said one of the cryovials;

a cell culture flask storage rack; the mechanical arm being capable of moving the cell culture flask from the input and output unit to the cell culture flask storage rack; the cell culture flask storage rack adapted to store the cell culture flask;

a cover operating device; the mechanical arm being capable of moving said cryovial from the thermostatic device to the cover operating device; the mechanical arm being capable of moving the cell culture flask from the cell culture flask storage rack to the cover operating device; the cover operating device being capable of opening or closing a cover of said cryovial, and being capable of opening or closing a cover of said cell culture flask; and wherein, the automatic cell cryopreservation and thawing apparatus has a refrigeration room; a temperature in the refrigeration room being lower than a temperature outside the refrigeration room;

the cryopreservation cartridge, the cryopreservation tank, and the cartridge moving mechanism are located in the refrigeration room;

the cryopreservation tray picker is located out of the refrigeration room and is capable of extending into the refrigeration room to remove or place one of the cryopreservation trays from or onto one of the tray shelf segments.

2. The automatic cell cryopreservation and thawing apparatus as claimed in claim 1, wherein the automatic cell cryopreservation and thawing apparatus has a refrigeration tunnel connected to the refrigeration room; an arm opening formed on a wall of the refrigeration tunnel;

a temperature maintaining cover mounted on the arm opening and selectively opening the arm opening;

the cryopreservation tray picker is located in the refrigeration tunnel;

the mechanical arm is capable of passing through the arm opening to access one of the cryovials loaded in the cryopreservation tray held by the cryopreservation tray picker after the temperature maintaining cover opens the arm opening.

3. The automatic cell cryopreservation and thawing apparatus as claimed in claim 1, wherein multiple mounting ribs are mounted on each of the mounting walls; the mounting ribs on one of the mounting walls and the mounting ribs on another one of the mounting walls form the tray shelf segments; and each of the cryopreservation trays is detachably mounted on the mounting ribs of two of the mounting walls.

4. The automatic cell cryopreservation and thawing apparatus as claimed in claim 3, wherein each of the mounting ribs forms a position limiting protrusion; and each of the cryopreservation trays forms two position limiting recesses;

the two position limiting recesses are capable of respectively engaging with the position limiting protrusions of the mounting ribs of two of the mounting walls.

5. The automatic cell cryopreservation and thawing apparatus as claimed in claim 4, wherein the frame has a central axle; the mounting walls connected to the central axle and arranged annularly around the central axle, and the mounting walls spaced apart from each other, and each one of the mounting walls extending along a radial direction of the central axle; and each of the cryopreservation trays is in a sector shape.

6. The automatic cell cryopreservation and thawing apparatus as claimed in claim 3, wherein the frame has a central axle; the mounting walls connected to the central axle and arranged annularly around the central axle, and the mounting walls spaced apart from each other, and each one of the mounting walls extending along a radial direction of the central axle; and each of the cryopreservation trays is in a sector shape.

7. The automatic cell cryopreservation and thawing apparatus as claimed in claim 1, wherein the frame has a central axle; the mounting walls connected to the central axle and arranged annularly around the central axle, and the mounting walls spaced apart from each other, and each one of the mounting walls extending along a radial direction of the central axle; and each of the cryopreservation trays is in a sector shape.

* * * * *